US007406356B2

(12) United States Patent
Peeters et al.

(10) Patent No.: US 7,406,356 B2
(45) Date of Patent: Jul. 29, 2008

(54) METHOD FOR CHARACTERIZING THE TIMBRE OF A SOUND SIGNAL IN ACCORDANCE WITH AT LEAST A DESCRIPTOR

(75) Inventors: Geoffroy Peeters, Paris (FR); Stephen McAdams, Deuil-la-Barre (FR); Jochen Krimphoff, Paris (FR); Patrick Susini, Paris (FR); Nicolas Misdaris, Paris (FR); Bennett Smith, Paris (FR)

(73) Assignee: France Telecom, Paris (FR)

( * ) Notice: Subject to any disclaimer, the term of this patent is extended or adjusted under 35 U.S.C. 154(b) by 482 days.

(21) Appl. No.: 10/490,607

(22) PCT Filed: Sep. 26, 2002

(86) PCT No.: PCT/FR02/03291

§ 371 (c)(1),
(2), (4) Date: Mar. 24, 2004

(87) PCT Pub. No.: WO03/028005

PCT Pub. Date: Apr. 3, 2003

(65) Prior Publication Data

US 2004/0220799 A1 Nov. 4, 2004

(30) Foreign Application Priority Data

Sep. 26, 2001 (FR) .................................. 01 12384

(51) Int. Cl.
*G10L 11/00* (2006.01)
*G06F 17/14* (2006.01)

(52) U.S. Cl. ........................... 700/94; 84/615; 704/206

(58) Field of Classification Search .................. 84/615; 704/206, 209; 700/94
See application file for complete search history.

(56) References Cited

U.S. PATENT DOCUMENTS

| | | | | |
|---|---|---|---|---|
| 4,384,335 | A | 5/1983 | Willems et al. | |
| 5,327,518 | A | 7/1994 | George et al. | |
| 5,479,564 | A | 12/1995 | Eggen et al. | |
| 5,918,203 | A * | 6/1999 | Herre et al. | 704/205 |

(Continued)

FOREIGN PATENT DOCUMENTS

FR 2 639 459 A 5/1990

OTHER PUBLICATIONS

Peeters, Geoffroy, Stephen McAdams, and Perfecto Herrera. Instrument Sound Description in the Context of MPEG-7. Proceedings of ICMC2000 (International Computer Music Conference), Berlin, Germany, Aug. 27-Sep. 1, 2000.*

(Continued)

*Primary Examiner*—Lincoln Donovan
*Assistant Examiner*—Andrew R Millikin
(74) *Attorney, Agent, or Firm*—Harness, Dickey & Pierce, PLC

(57) ABSTRACT

The invention concerns a method for characterizing the timbre of a time-varying sound signal s(t) using at least one descriptor, where the at least one descriptor includes a harmonic spectral spread of the sound signal s(t). The sound signal s(t) may be compared to other sound signals using the at least one descriptor. The at least one descriptor may also include a harmonic spectral deviation of the sound signal s(t).

14 Claims, 2 Drawing Sheets

U.S. PATENT DOCUMENTS 6,182,042 B1 1/2001 Peevers

OTHER PUBLICATIONS

International Search Report for PCT/FR02/03291; ISA/EP; Mailed: Mar. 6, 2003.

Krumhansl, C.L. (1989) Structure and perception of electroacoustic sound and music, chapter "Why is musical timbre so hard to understand?" pp. 43-53. S. Nielzen and O. Olsson, Elsevier, Amsterdam (Expcerpta Medica 846) edition.

McAdams, S. and Winsberg, S. (2000) "Phychophysical quantification of individual differences in timbre perception."

* cited by examiner

METHOD FOR CHARACTERIZING THE TIMBRE OF A SOUND SIGNAL IN ACCORDANCE WITH AT LEAST A DESCRIPTOR

The invention relates to a process for characterisation of the timbre of a sound signal, according to at least one descriptor.

The domain of the invention is characterisation of the timbre of a sound signal varying as a function of time.

The timbre of a sound signal is characterised intuitively by all perceptive properties excluding the tone pitch, the perceived intensity and the subjective duration of the sound signal.

Characteristics vary as a function of the various categories of sound signals. For example, a distinction is made between harmonic sound signals such as sounds produced by a violin, a flute, etc., and percussive sound signals such as those produced by a drum, etc. Obviously, there are other categories.

Timbre measurements were made for harmonic and percussive sound signal categories: each of these measurement assemblies forms either a harmonic or percussive timbre space.

An attempt is made to model the timbre of a sound signal s(t), or more precisely to model its characteristics also called descriptors, for example so as to be able to recognise or locate the timbre of an unknown signal, among known timbres in a sound database. Models of these characteristics are usually expressed as a function of spectral and time envelopes of the sound signal s(t) and of their variation.

Figure 1:
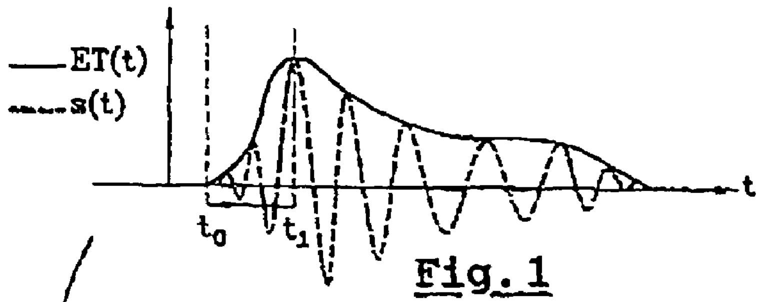
Figure 2:
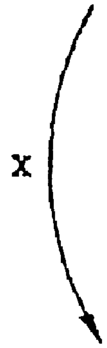
Figure 2:
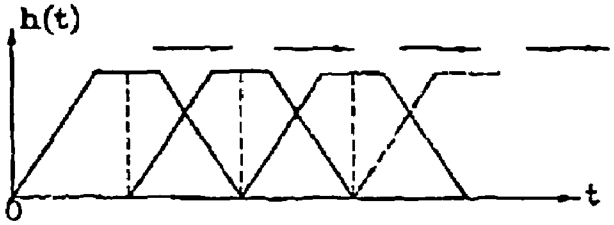
Figure 3:
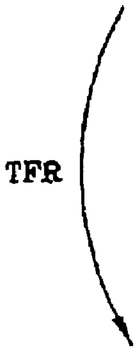
Figure 3:
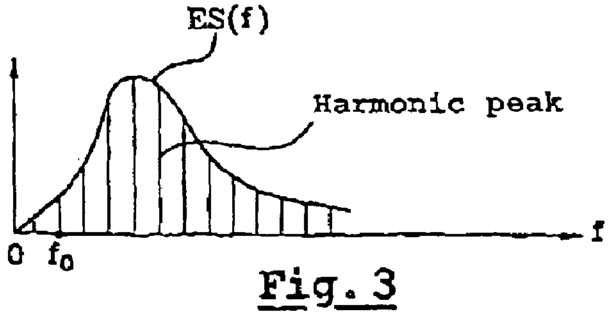

The sound signal s(t) and the time envelope ET(t) are illustrated in FIG. 1; the spectral envelope ES(f) is illustrated in FIG. 3; it is usually obtained following a first step consisting of analysing the signal according to a sliding time window, an example of which is shown in FIG. 2, followed by a second step consisting of calculating the Fast Fourier Transform of the signal resulting from the previous step.

Example models of characteristics, and calculations of the distance between the timbres of the two sound signals in the same timbre space as a function of these characteristics, are suggested in the publication "validation of a multidimensional distance model for perceptual dissimilarities among musical timbres" N. Misdariis et al., Proceedings of the $16^{th}$ International Congress on Acoustics and $135^{th}$ Meeting Acoustical Society of America, Seattle, Wash., 20-26 Jun. 1998.

These characteristics include the following, some of which are presented in the publication mentioned:

the logarithmic attack time (lat or LT) defined as being the logarithm of the difference between the time t0 at which the signal starts and the time t1 at which the signal stabilises as in the case of harmonic sound signals, or reaches its maximum as in the case of percussive sound signals; $lat=\log_{10}(t1-t0)$; these times t0 and t1 are shown in FIG. 1; in the publication mentioned, t0 is the time at which the signal amplitude reaches 2% of the maximum amplitude;

the harmonic spectral centroid (hsc) or SC defined as being the average of the instantaneous spectral centroid over the duration of the signal, in other words considered in a sliding analysis window;

the instantaneous spectral centroid itself is defined by the weighted average of harmonic peaks of the spectrum of the signal represented in FIG. 3 and in a way corresponds to the equilibrium point of all harmonic peaks.

Figure 4:
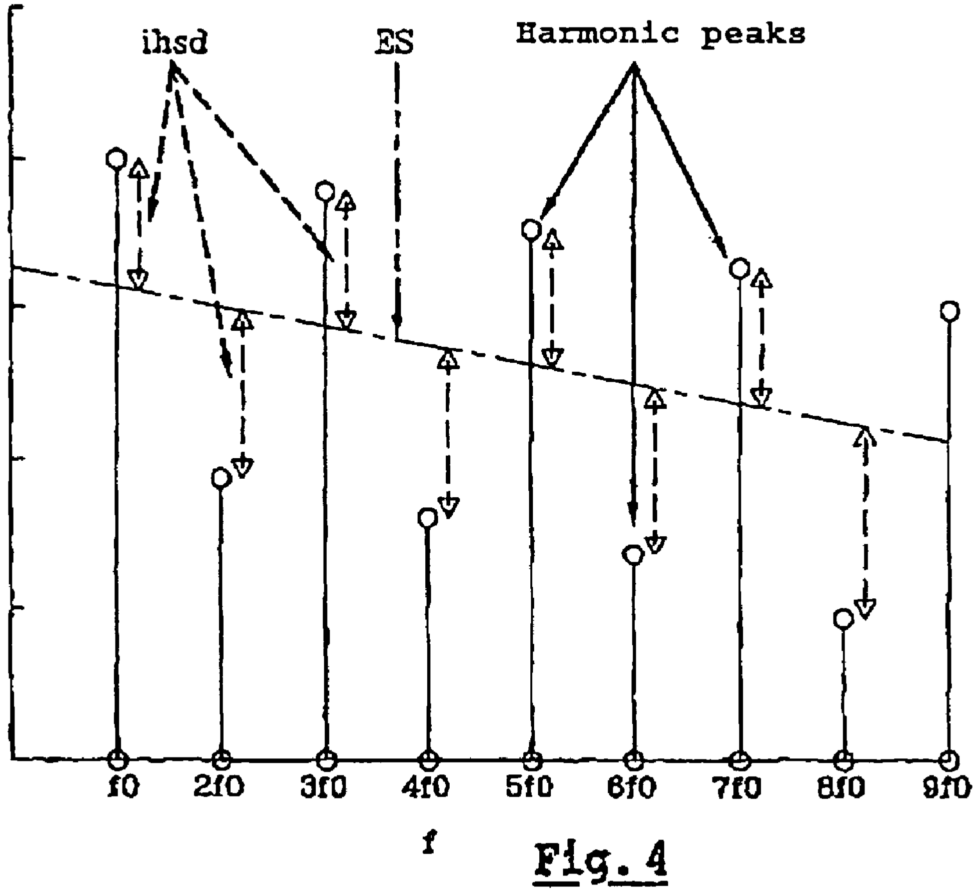

One simple method among the methods of obtaining harmonic peaks of a signal consists firstly of extracting the fundamental frequency f0 of the sound signal s(t), and then secondly detecting harmonic peaks located around multiples of the fundamental frequency f0 as illustrated in FIG. 3. For example, the local fundamental frequency may be obtained by calculating the normalised self-correlation function of the local signal s(t); the local fundamental frequency f0 then corresponds to the inverse of the time T0 of the first maximum of this function;

the harmonic spectral deviation (hsd) representative of the spectral irregularity defined as being the average of the instantaneous harmonic spectral deviation considered in a sliding analysis window, over the duration of the signal; the instantaneous harmonic spectral deviation itself is defined as being the spectral deviation of amplitude peaks (in a logarithmic scale) of the spectrum with respect to the spectral envelope. An example of an instantaneous harmonic spectral deviation (ihsd) corresponding to the sound signal of a clarinet is illustrated in FIG. 4;

the harmonic spectral variation (hsv) representative of the spectral flux, defined as being the average of the instantaneous harmonic spectral variation over the duration of the signal, considered in an analysis window; the instantaneous harmonic spectral variation itself is defined as being the 1's complement of the normalised correlation between the amplitude of harmonics in two adjacent windows.

Therefore the purpose of this invention is to define new characteristics or descriptors so that when combined with known descriptors, they are at best applicable to different timbre spaces and are used to make optimum calculations of the distance between two sound signals within the same timbre space.

The purpose of the invention is a process for characterisation of the timbre of a sound signal s(t) varying as a function of time for a duration D according to at least one descriptor, characterized mainly in that it consists of defining the said descriptor by the harmonic spectral spread (hss) of the signal.

According to one characteristic of the invention, one of the descriptors being the harmonic spectral centroid (hsc), the harmonic spectral spread of the signal is calculated according to the following steps:

a) memorise the signal s(t), b) extract its fundamental frequency f0, c) calculate and memorise harmonics of the signal s(t) truncated within a time window h(t) with a duration less than or equal to D, as a function of the frequency using a fast Fourier transform system, making the said time window h(t) slide over the duration D of the signal s(t), d) for each time window h(t), calculate the harmonic spectral spread of the truncated signal hss(s(t).h(t)) using the following formula:

$$hss(s.h) = \frac{1}{hsc(s.h)}\sqrt{\frac{\sum_{nbh} A^2(s.h, harm)[f(s.h, harm) - hsc(s.h)]^2}{\sum_{nbh} A^2(s.h, harm)}}$$

where A(s.h, harm) is the amplitude of harmonic peak number harm of the spectrum of the truncated signal s.h, f(s.h, harm) is the frequency of harmonic number harm of the spectrum of the truncated signal, nbh is the number of harmonics in the spectrum of the truncated signal s.h, hsc(s.h) is the harmonic spectral centroid of the truncated signal s.h.

memorise each hss(s.h)

e) calculate the harmonic spectral spread of the signal hss(s) using the following formula:

$$hss(s) = \frac{\sum_{nbf} hss(s.h)}{nbf}$$

where nbf is the number of windows obtained by sliding the window h(t) over the duration D of the signal s(t).

According to an additional characteristic, a second descriptor called a harmonic spectral deviation (hsd) being used, step d) also includes the calculation of the harmonic spectral deviation of the truncated signal hsd(s(t).h(t)) using the following formula:

$$hsd(s.h) = \frac{\sum_{nbh} |A(s.h, harm) - SE(s.h, harm)|}{\sum_{nbh} A(s.h, harm)}$$

where SE(s.h,harm) is the local spectral envelope of the truncated signal s.h (with an amplitude at logarithmic scale) around harmonic peak number harm, and in that step e) then consists of also calculating the harmonic spectral deviation of the signal hsd(s):

$$hsd(s) = \frac{\sum_{nbf} hsd(s.h)}{nbf}$$

According to one particular embodiment of the invention, the duration of the window h(t) is equal or approximately equal to D and the number of windows nbf is equal to 1.

The sound signal is preferably a harmonic signal.

The invention also relates to a process for measurement of the distance "dist" between two harmonic sound signals, characterised in that it consists of using the characterisation of signals like those described above.

Since the characterisation of sound signals is based on the following descriptors, the logarithmic attack time (lat), the harmonic spectral centroid (hsc), the harmonic spectral deviation (hsd) and the harmonic spectral variation (hsv), the distance "dist" is in the form:

$$dist=\sqrt{x_1}(\Delta lat)^2+x_2(\Delta hsc)^2+x_3(\Delta hsd)^2+(x_4\Delta hss+x_5\Delta hsv)^2$$

where $x_1$, $x_2$, $x_3$, $x_4$, $x_5$ are predetermined coefficients.

According to one preferred embodiment, the logarithmic attack time (lat) is calculated on a decimal logarithmic scale and $5<x_1<11$, $10^{-5}<x_2<5\times10^{-5}$, $10^{-4}<x_3<5\times10^{-4}$, $5<x_4<15$ and $-30<x_5<-90$.

Other specific features and advantages of the invention will become clearer after reading the following description given as a non-limitative example, and with reference to the attached drawings on which:

FIG. 1 diagrammatically shows a sound signal s(t) and its time envelope ET(t) as a function of time t;

FIG. 2 diagrammatically shows a sliding analysis time window h(t);

FIG. 3 diagrammatically shows harmonic peaks and a spectral envelope ES(f) as a function of the frequency f;

FIG. 4 diagrammatically illustrates the instantaneous harmonic spectral deviation of a clarinet.

The sound signal s(t) varying as a function of the time t and a duration D represented in FIG. 1, is analysed according to a sliding time window h(t) shown in FIG. 2, which may for example be a Hamming window.

The duration D of the signal is usually of the order of a few seconds, for example in the case of sound samples to be located among signals in a database; but it could be much longer.

According to the invention, a new descriptor representative of the harmonic spectral spread is used to contribute to the description of the timbre of a preferably harmonic sound signal and to enable a more precise calculation of the distance between two sound signals in the same harmonic timbre space.

The harmonic spectral spread corresponds to a frequency spreading coefficient of the energy of the harmonic part of the signal, about the spectral centroid.

The calculation of the harmonic spectral spread (hss) includes the following steps carried out on a computer, particularly including one or several memories and a central processing unit comprising at least one microprocessor, a program memory and a working memory:

a) the signal s(t) with duration D is memorised, b) its fundamental period f0 is extracted according to a known process presented above in the description of the state of the art, c) harmonics of the signal s(t) truncated according to a time window h(t) such as a Hamming window, for example with a duration N.T0, where T0 is the fundamental period (duration h(t), for example equal to 80 milliseconds where N=8 and T0=10 milliseconds), are calculated starting from the function obtained using a fast Fourier transform program and making the window h(t) slide over the duration D: the position and amplitude of the maxima of this function considered around a multiple of the fundamental frequency f0, determine the frequency and amplitude respectively of the harmonics; these harmonics are memorised;

d) for each window h(t), the harmonic spectral spread of the truncated signal h ss(s(t).h(t)) is calculated using the following formula:

$$hss(s.h) = \frac{1}{hsc(s.h)} \sqrt{\frac{\sum_{nbh} A^2(s.h, harm)[f(s.h, harm) - hsc(s.h)]^2}{\sum_{nbh} A^2(s.h, harm)}}$$

where A(s.h, harm) is the amplitude of harmonic peak number harm of the spectrum of the truncated signal s.h, f(s.h, harm) is the frequency of harmonic number harm of the spectrum of the truncated signal s.h, nbh is the number of harmonics in the spectrum of the truncated signal s.h, hsc(s.h) is the harmonic spectral centroid of the truncated signal s.h calculated according to a state of the art method, for which an example is given later, the values hss(s(t).h(t)) thus obtained are memorised.

e) the harmonic spectral spread of the signal s(t) is calculated as follows:

$$hss(s) = \frac{\sum_{nbf} hss(s.h)}{nbf}$$

where nbf is the number of windows obtained by making the window h(t) slide over the duration D of the signal s(t).

In the special case of a stationary or quasi stationary signal, the harmonic spectral spread of the signal s(t) is calculated directly over the duration D of the signal. This is equivalent to saying that the duration of the analysis window h(t) is equal or approximately equal to the duration D of the signal and that the number of windows is then equal to 1.

As soon this new descriptor is available, it can advantageously be combined with the other descriptors lat, hsc, hsd and hsv according to the state of the art, and for example the distance "dist" between two sound signals within the same harmonic timbre space can be calculated using the following formula:

$$dist = \sqrt{x_1(\Delta lat)^2 + x_2(\Delta hsc)^2 + x_3(\Delta hsd)^2 + (x_4\Delta hss + x_5\Delta hsv)^2}$$

where Δ is the difference between values of the same descriptor for the two sound signals considered and $x_1$, $x_2$, $x_3$, $x_4$ and $x_5$ are predetermined coefficients.

The logarithmic attack time, lat, is calculated using the formula indicated in the state of the art:

$$\mathrm{lat}(s) = \log_{10}(t1 - t0)$$

For the calculation of the harmonic spectral centroid hsc of the truncated signal, the step d) of the calculation of hss will be completed by the following calculation known to those skilled in the art:

$$hsc(s.h) = \frac{\sum_{nbh} f(s.h, harm) \cdot A(s.h, harm)}{\sum_{nbh} A(s.h, harm)}$$

In the same way as for the descriptor hss(s) (step e), the following is obtained for the harmonic spectral centroid of the signal s(t):

$$hsc(s) = \frac{\sum_{nbf} hsc(s.h)}{nbf}$$

Step d) in the calculation of hss will advantageously be completed by the following calculation in order to calculate the harmonic spectral deviation hsd of the truncated signal:

$$hsd(s.h) = \frac{\sum_{nbh} |A(s.h, harm) - SE(s.h, harm)|}{\sum_{nbh} A(s.h, harm)}$$

where SE(s.h,harm) is the local spectral envelope of the truncated signal (with an amplitude at a logarithmic scale) around harmonic peak number harm using a method known to those skilled in the art.

In the same way as for the descriptor hss(s) (step e), the harmonic spectral deviation of the signal s(t) is given by:

$$hsd(s) = \frac{\sum_{nbf} hsd(s \cdot h)}{nbf}$$

Step d) in the calculation of hss will be completed by the following calculation known to those skilled in the art, in order to calculate the harmonic spectral variation hsv of the truncated signal:

$$hsv(s \cdot h) = 1 - \frac{\sum_{nbh} A(s \cdot h - 1, \mathrm{harm}) \cdot A(s \cdot h, \mathrm{harm})}{\sqrt{\sum_{nbh} A^2(s \cdot h, \mathrm{harm})} \cdot \sqrt{\sum_{nbh} A^2(s \cdot h - 1, \mathrm{harm})}}$$

In the same way as for the descriptor hss(s) (step e), the harmonic spectral variation of the signal s(t) is given by:

$$hsv(s) = \frac{\sum_{nbf} hsv(s \cdot h)}{nbf}$$

In particular, the distance was measured by calculating descriptors according to the formulas given above, the logarithmic attack time lat being calculated on a decimal logarithmic scale using coefficients within the following ranges:

$$5 < x_1 < 11,\ 10^{-5} < x_2 < 5\times10^{-5},\ 10^{-4} < x_3 < 5\times10^{-4},\ 5x_4 < 15 \text{ and } -30 < x_5 < -90.$$

What is claimed is:

1. A process for characterisation of the timbre of a sound signal s(t) varying as a function of time for a duration D according to at least one descriptor, characterised in that the at least one descriptor includes the harmonic spectral spread (hss) of the sound signal, and-the sound signal is compared to a second sound signal using the at least one descriptor, and a recognition signal is outrut based on the comparison, wherein the hss is calculated by defining a time window h(t) having a duration less than D, sliding the time window h(t) over the duration D of the sound signal, and calculating a truncated hss corresponding to each time window h(t).

2. The process according to claim 1, characterised in that the harmonic spectral spread of the signal is calculated according to the following steps:

a) memorise the sound signal s(t), b) extract its fundamental frequency f0, c) calculate and memorise harmonics of the sound signal s(t) truncated within the time window h(t), as a function of frequency using a fast Fourier transform system, d) for each time window h(t), calculate the harmonic spectral spread of the truncated signal hss(s(t).h(t)) using the following formula:

$$hss(s\cdot h)=\frac{1}{hsc(s\cdot h)}\sqrt{\frac{\sum_{nbh}A^2(s\cdot h,\text{harm})[f(s\cdot h,\text{harm})-hsc(s\cdot h)]^2}{\sum_{nbh}A^2(s\cdot h,\text{harm})}}$$

where A(s.h, harm) is the amplitude of harmonic peak number harm of the spectrum of the truncated signal s.h, f(s.h, harm) is the frequency of harmonic number harm of the spectrum of the truncated signal, nbh is the number of harmonics in the spectrum of the truncated signal s.h, hsc(s.h) is the harmonic spectral centroid of the truncated signal s.h, and memorise each hss(s.h), e) calculate the harmonic spectral spread of the signal hss(s) using the following formula:

$$hss(s)=\frac{\sum_{nbf}hss(s\cdot h)}{nbf}$$

where nbf is the number of windows obtained by sliding the window h(t) over the duration D of the sound signal s(t).

3. The process according to claim 2 and according to which a second descriptor is used, this descriptor being the harmonic spectral deviation (hsd), characterised in that step d) also includes the calculation of the harmonic spectral deviation of the truncated signal hsd(s(t).h(t)) using the following formula:

$$hsd(s\cdot h)=\frac{\sum_{nbh}|A(s\cdot h,\text{harm})-SE(s\cdot h,\text{harm})|}{\sum_{nbh}A(s\cdot h,\text{harm})}$$

where SE(s.h, harm) is the local spectral envelope of the truncated signal s.h (with an amplitude at logarithmic scale) around harmonic peak number harm, and in that step e) also includes calculating the harmonic spectral deviation hsd(s) of the sound signal according to the following formula:

$$hsd(s)=\frac{\sum_{nbf}hsd(s\cdot h)}{nbf}$$

4. The process according to claims 1, 2, or 3, characterised in that the sound signal and the second sound signal are in the same timbre space.

5. The process for measurement of the distance “dist” between the sound signal and the second sound signal, characterised in that the distance “dist” uses the characterisation of signals according to claims 2 or 3.

6. The process for measuring the distance “dist” according to claim 5, the characterisation of sound signals also being based on the following descriptors, the logarithmic attack time (lat), the harmonic spectral centroid (hsc), the harmonic spectral deviation (hsd), and the harmonic spectral variation (hsv), characterised in that the distance “dist” is in the form:

$$dist=\sqrt{x_1(\Delta lat)^2+x_2(\Delta hsc)^2+x_3(\Delta hsd)^2+(x_4\Delta hss+x_5\Delta hsv)^2}$$

where x1, x2, x3, x4, and x5 are predetermined coefficients.

7. Process according to claim 6, characterised in that the logarithmic attack time (lat) is calculated on a decimal logarithmic scale and $5<x_1<11$, $10^{-5}<x_2<5\times10^{-5}$, $10^{-4}<x_3<5\times10^{-4}$, $5<x_4<15$ and $-30<x_5<-90$.

8. A process comprising:

calculating N partial harmonic spectral spreads (HSS’s ) of a first sound signal;

calculating the HSS of the first sound signal by averaging the N partial HSS’S, wherein a first profile of the first sound signal includes the HSS of the first sound signal;

comparing the first profile to a second profile of a second sound signal to determine similarity of the first sound signal to the second sound signal, wherein the second profile includes an HSS of the second sound signal; and outputting a recognition signal based upon the comparing.

9. The process of claim 8 further comprising calculating each of the N partial HSS’s using the following equation:

$$HSS(s\cdot h)=\frac{1}{HSC(s\cdot h)}\sqrt{\frac{\sum_{nbh}A^2(s\cdot h,\text{harm})[f(s\cdot h,\text{harm})-HSC(s\cdot h)]^2}{\sum_{nbh}A^2(s\cdot h,\text{harm})}},$$

wherein s.h is the first sound signal truncated by one of the N time windows,

HSS(s.h) is the partial HSS of s.h, nbh is a number of harmonics in a frequency spectrum of s.h, harm is the index of summation, A(s.h, harm) is an amplitude of harmonic peak number harm of the frequency spectrum of s.h, f(s.h, harm) is a frequency of harmonic peak number harm of the frequency spectrum of s.h, and HSC(s.h) is a harmonic spectral centroid of s.h.

10. The process of claim 8 further comprising matching the first profile to a stored profile in a database based on the recognition signal, wherein the database includes the second profile.

11. The process of claim 8 further comprising:

calculating P partial harmonic spectral deviations (HSD’s) of the first sound signal, each corresponding to the first sound signal truncated by one of P time windows; and calculating an HSD of the first sound signal by averaging the P partial HSD’s, wherein the first profile includes the HSD of the first sound signal.

12. The process of claim 11 further comprising calculating each of the P partial HSD’ss using the following equation:

$$HSD(s\cdot h)=\frac{\sum_{nbh}|A(s\cdot h,\text{harm})-SE(s\cdot h,\text{harm})|}{\sum_{nbh}A(s\cdot h,\text{harm})},$$

wherein s.h is the first sound signal truncated by one of the P time windows,

HSD(s.h) is the partial HSD of s.h, nbh is a number of harmonics in a frequency spectrum of s.h, harm is the index of summation, A(s.h, harm) is an amplitude of harmonic peak number harm of the frequency spectrum of s.h, SE(s.h, harm) is a local spectral envelope of s.h with a logarithmic scale amplitude around harmonic peak number harm, and HSC(s.h) is a harmonic spectral centroid of s.h.

13. The process of claim 11 wherein the first and second profiles also include logarithmic attack time (LAT), harmonic spectral centroid (HSC), harmonic spectral variation (HSV), and further comprising calculating a distance between the first and second sound signals using the following equation:

$$dist = \sqrt{x_1(\Delta LAT)^2 + x_2(\Delta HSC)^2 + x_3(\Delta HSD)^2 + (x_4\Delta HSS + x_5\Delta HSV)^2},$$

wherein dist is the distance between the first and second sound signals,

ΔLAT is a difference between the LAT of the first profile and the LAT of the second profile, ΔHSC is a difference between the HSC of the first profile and the HSC of the second profile, ΔHSD a difference between the HSD of the first profile and the HSD of the second profile, ΔHSS a difference between the HSS of the first profile and the HSS of the second profile, ΔHSV a difference between the HSV of the first profile and the HSV of the second profile, and x1, x2, x3, x4, and x5 are predetermined coefficients.

14. A process for characterisation of the timbre of a sound signal s(t) varying as a function of time for a duration D according to at least one descriptor, characterised in that the at least one descriptor includes the harmonic spectral spread (hss) of the sound signal, the sound signal is compared to a second sound signal from a database using the at least one descriptor, and a recognition signal is output based on the comparison, wherein the hss is calculated according to the following steps:

a) memorise the signal s(t), b) extract its fundamental frequency f0, c) calculate and memorise harmonics of the sound signal s(t) truncated within a time window h(t) with a duration less than or equal to D, as a function of the frequency using a fast Fourier transform system, making the time window h(t) slide over the duration D of the sound signal s(t), d) for each time window h(t), calculate the harmonic spectral spread of the truncated signal hss(s(t).h(t)) using the following formula:

$$hss(s\cdot h) = \frac{1}{hsc(s\cdot h)}\sqrt{\frac{\sum_{nbh} A^2(s\cdot h, \text{harm})[f(s\cdot h, \text{harm}) - hsc(s\cdot h)]^2}{\sum_{nbh} A^2(s\cdot h, \text{harm})}}$$

where A(s.h, harm) is the amplitude of harmonic peak number harm of the spectrum of the truncated signal s.h, f(s.h, harm) is the frequency of harmonic number harm of the spectrum of the truncated signal, nbh is the number of harmonics in the spectrum of the truncated signal s.h, hsc(s.h) is the harmonic spectral centroid of the truncated signal s.h, and memorise each hss(s.h), e) calculate the harmonic spectral spread of the signal hss(s) using the following formula:

$$hss(s) = \frac{\sum_{nbf} hss(s\cdot h)}{nbf}$$

where nbf is the number of windows obtained by sliding the window h(t) over the duration D of the sound signal s(t).

* * * * *